United States Patent [19]

Henderson

[11] 4,188,832
[45] Feb. 19, 1980

[54] ENDLESS POWER TRANSMISSION BELT

[75] Inventor: Dewey D. Henderson, Springfield, Mo.

[73] Assignee: Dayco Corporation, Dayton, Ohio

[21] Appl. No.: 974,452

[22] Filed: Dec. 29, 1978

[51] Int. Cl.² .......................... F16G 5/16; F16G 1/00
[52] U.S. Cl. ................................. 74/233; 74/231 CB; 74/231 P
[58] Field of Search ............... 156/138, 139, 140, 141; 74/232, 233, 231 R, 231 P, 231 CB, 237, 239

[56] References Cited

U.S. PATENT DOCUMENTS

| 2,538,414 | 1/1951 | Crosby | 156/141 |
|---|---|---|---|
| 3,164,026 | 1/1965 | Terhune | 74/233 |
| 3,353,419 | 11/1967 | Richmond | 74/233 |
| 3,419,449 | 12/1968 | Di Valerio et al. | 74/232 X |
| 3,535,946 | 10/1970 | Miller | 74/232 |
| 3,564,933 | 2/1971 | Clinkenbeard | 74/233 |
| 3,580,767 | 5/1971 | Barnes et al. | 74/237 |
| 3,621,727 | 11/1971 | Cicognani | 74/239 |
| 3,820,409 | 6/1974 | Meadows | 74/233 |
| 3,853,017 | 12/1974 | White, Jr. | 74/237 X |
| 3,863,515 | 2/1975 | Meadows | 74/232 |
| 3,948,113 | 4/1976 | Stork | 74/237 X |
| 3,968,703 | 7/1976 | Bellman | 74/233 |
| 4,022,071 | 5/1977 | Abatemarco | 74/237 |
| 4,131,030 | 12/1978 | White, Jr. | 74/231 P |

FOREIGN PATENT DOCUMENTS

| 638390 | 6/1950 | United Kingdom | 74/233 |
|---|---|---|---|
| 1326670 | 8/1973 | United Kingdom | 74/233 |

Primary Examiner—Leslie Braun
Attorney, Agent, or Firm—Reuben Wolk

[57] ABSTRACT

An endless power transmission belt and method of making same are provided wherein such belt has a tension section, a load-carrying section, a toothed compression section defined by alternating projections and recesses, and a crack-barrier layer disposed between the recesses and the load-carrying section with the crack-barrier layer being a fabric layer.

10 Claims, 11 Drawing Figures

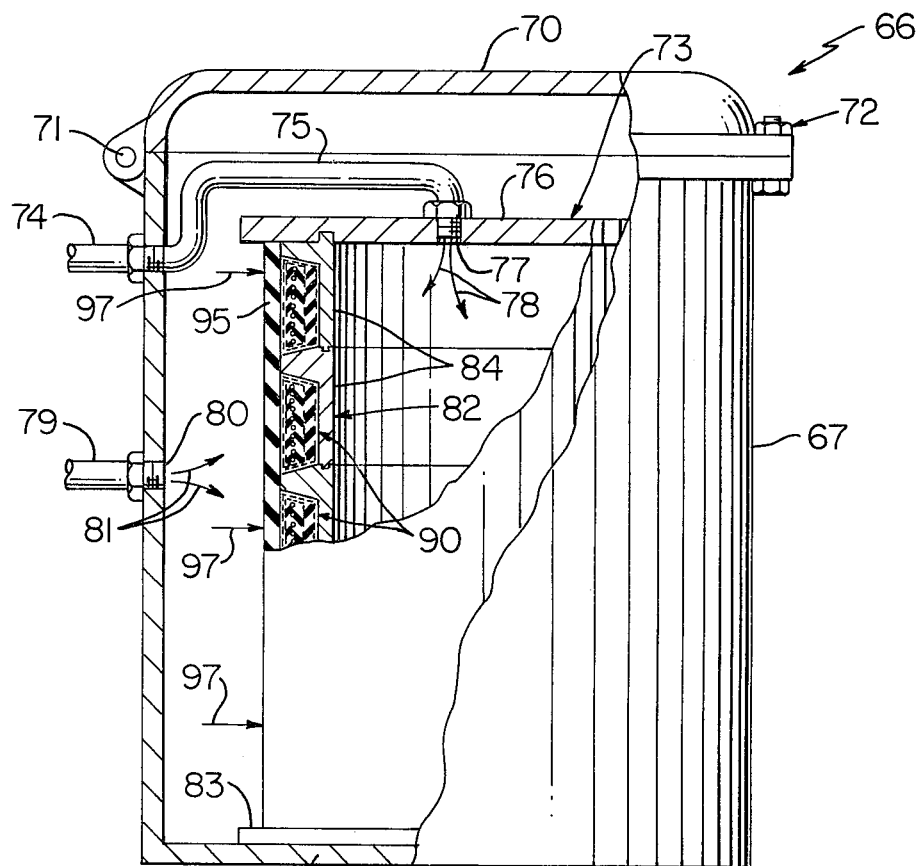
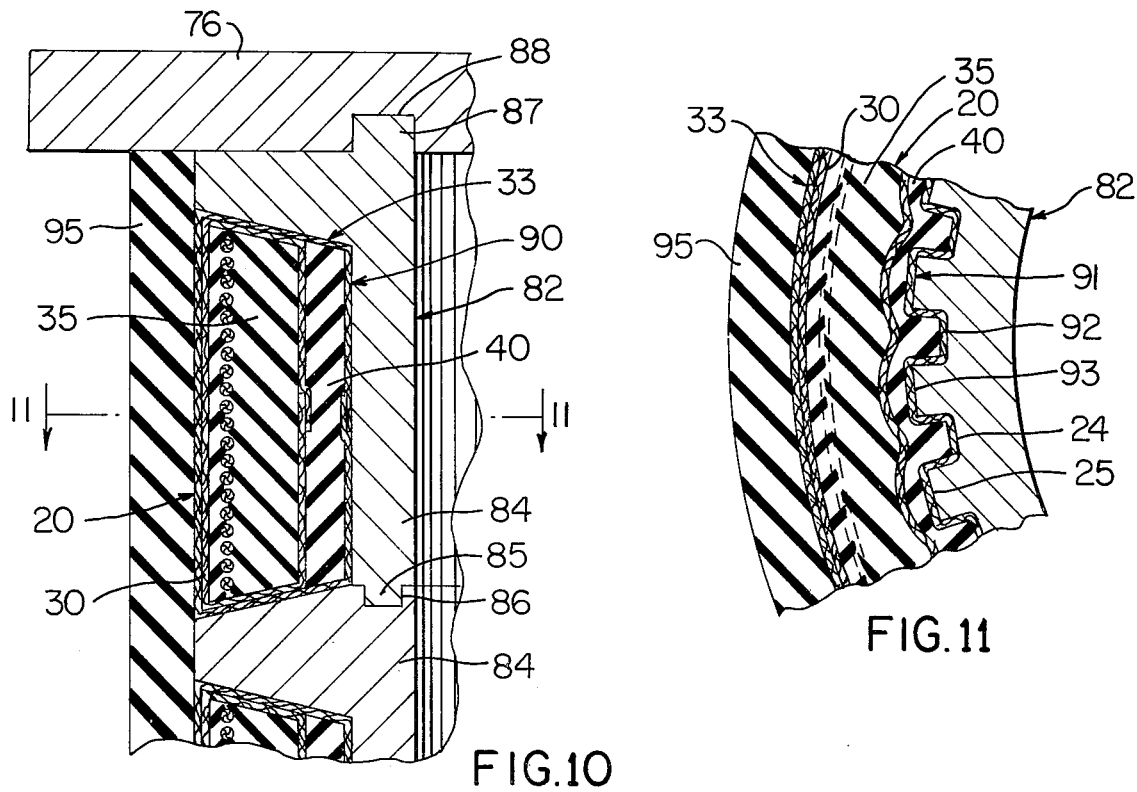
FIG. 9
FIG. 10
FIG. 11

4,188,832

ENDLESS POWER TRANSMISSION BELT

BACKGROUND OF THE INVENTION

1. Field of the Invention

This invention relates to an endless power transmission belt and method of making same and in particular to such a belt having a toothed compression section.

2. Prior Art Statement

It is known in the art to provide an endless power transmission belt and method of making same wherein such belt has a tension section, a load-carrying section, and a toothed compression section defined by alternating projections and recesses and which also has a so-called crack-barrier layer disposed between the recesses and the load-carrying section. An example of such a belt is taught in U.S. Pat. No. 3,353,419 which utilizes a so-called undulating soft layer of polymeric material to prevent any cracks forming in the toothed belt, usually at the roots of the teeth, from spreading or propagating into the remainder of the belt. However, a crack barrier made of a soft layer of polymeric material is not completely effective and does not improve the overall strength of the belt.

SUMMARY

It is a feature of this invention to provide an improved toothed endless power transmission belt having a crack-barrier layer made of a fabric material.

Another feature of this invention is to provide a belt of the character mentioned which has improved strength.

Another feature of this invention is to provide a belt of the character mentioned wherein the crack-barrier fabric layer extends in an undulating path and has apexes disposed within the base portions of the teeth of the toothed belt.

Another feature of this invention is to provide a belt of the character mentioned in which the fabric crack-barrier layer comprises a part of an inside cover which surrounds the tension section, load-carrying section, and that part of the compression section disposed inwardly of the fabric layer.

Another feature of this invention is to provide a belt of the character mentioned which has an inside cover of the character mentioned and also has an outside cover which completely surrounds the entire belt.

Another feature of this invention is to provide a belt of the character mentioned wherein the crack-barrier fabric layer separates the compression section of such belt into two portions consisting of a first portion disposed between one surface of the fabric layer and the load-carrying section of the belt and a second portion disposed between an opposite surface of the fabric layer and the outermost surface of the toothed compression section.

Another feature of this invention is to provide a belt of the character mentioned in which the two above-mentioned portions of the compression section are made of the same polymeric material.

Another feature of this invention is to provide an improved method of making an endless power transmission belt of the character mentioned.

Therefore, it is an object of this invention to provide an endless power transmission belt, and method of making same, having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 9 is a view with parts in cross section, parts in elevation, and parts broken away illustrating an exemplary embodiment of a mold apparatus which may be employed in curing a plurality of endless power transmission belts of this invention;

FIG. 10 is an enlarged fragmentary cross-sectional view of an upper portion of the mold apparatus particularly illustrating a belt disposed therewithin; and FIG. 11 is a fragmentary cross-sectional view taken essentially on the line 11—11 of FIG. 10.

DESCRIPTION OF ILLUSTRATED EMBODIMENT

Figure 1:
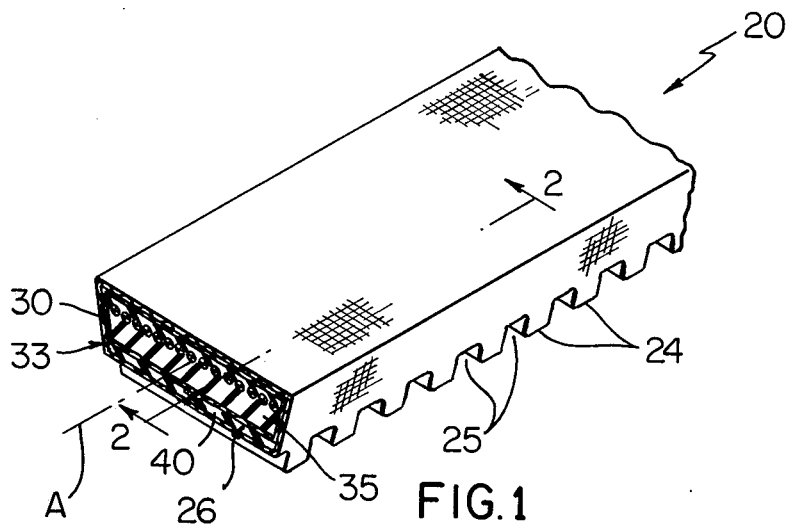
FIG. 1 is a fragmentary perspective view with the forward portion thereof in cross section illustrating one exemplary embodiment of an endless power transmission belt of this invention.

Reference is now made to FIG. 1 of the drawings which illustrates one exemplary embodiment of an endless power transmission belt of this invention and such belt is designated generally by the reference numeral 20. The belt 20 is of generally trapezoidal cross-sectional configuration and is in the form of a toothed belt as will be described in detail subsequently and as best seen in FIG. 2 such belt comprises a tension section 21, a load-carrying section comprised of a helically wound load-carrying cord 22, and a two-part compression section which is designated generally by the reference numeral 23 and will be described in detail subsequently.

The toothed compression section 23 is defined by alternating projections 24 and recesses 25 when viewing a side of the belt or a cross section thereof which is substantially parallel to a plane through the central longitudinal axis A of such belt and bisecting same. The projections 24 define the teeth which will also be referred to as teeth 24 of the compression section 23.

Figure 2:
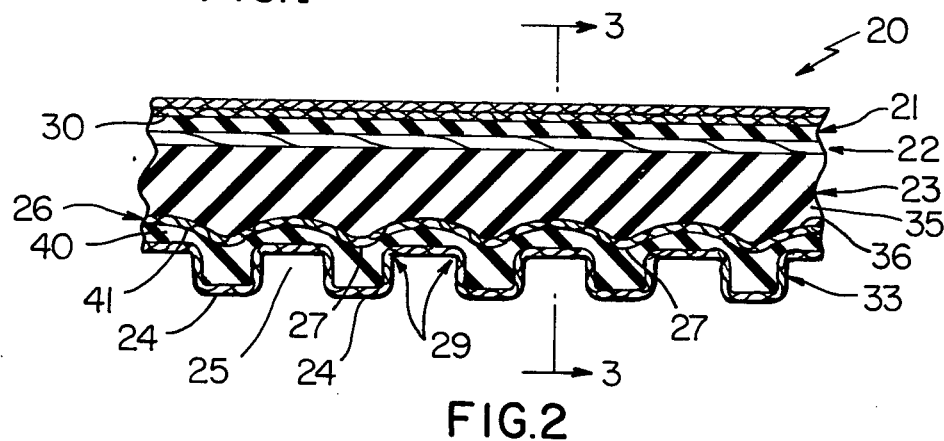
FIG. 2 is an enlarged fragmentary cross-sectional view taken essentially on the line 2—2 of FIG. 1.

The belt 20 has a crack-barrier layer in the form of a fabric layer 26 and such layer is disposed between the recesses 25 and the load-carrying section or cord 22; and, the fabric layer 26 extends in an undulating path which when viewed in cross section as shown in FIG. 2 has rounded apexes 27 disposed basically within the teeth 24 and in particular the central portion of each tooth 24. The manner in which rounded apexes are defined will be described in detail subsequently in connection with the method of this invention.

The fabric layer 26 serves as a crack-barrier and prevents the propagation or spreading of any cracks inwardly into the compression section 23 and into the remainder of the belt 20; and, such cracks ordinarily tend to form at the roots of the teeth 24 and in particular to typical areas as shown at 29 in FIG. 2. The fabric crack-barrier layer 26 not only prevents the propagation of cracks but also serves to strengthen the overall belt construction.

Figure 3:
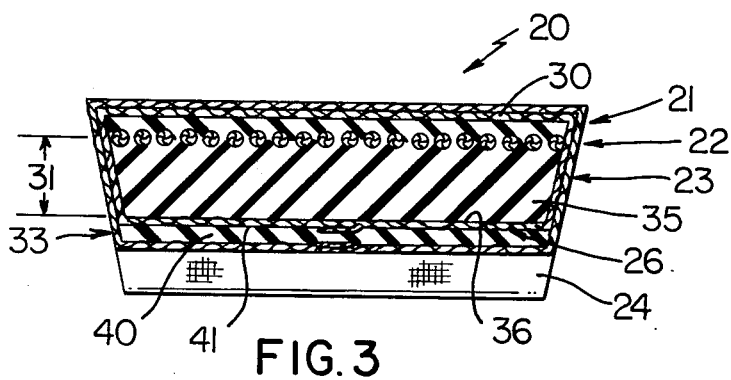
FIG. 3 is a cross-sectional view taken on the line 3—3 of FIG. 2.

The layer 26 comprises a part of an inside cover and such inside cover is illustrated in FIG. 3 and designated by the reference numeral 30. The cover 30 surrounds portions of the belt body comprising the tension section 21, load-carrying section 22, and that part of the compression section 23 which is disposed inwardly of the fabric layer 26 and basically comprises that part of the compression section disposed inwardly of layer 26 within the space indicated at 31. The layer 26 and hence cover 30 may be made of any suitable fabric material employed in belt making art; however, such fabric layer is preferably a woven fabric layer disposed in position as a bias fabric layer with the warps and wefts thereof each disposed at an angle to the central longitudinal axis A of the belt 20 and such angle is other than 90°.

The belt 20 also has an outside cover which defines the entire exposed surface of the belt and such cover is designated by the general reference numeral 33. Accordingly, the cover 33 defines the exposed undulating surface of the belt including the alternating projections or teeth 24 and recesses 25 of the compression section 23 as well as the top cover of the belt and the cover for the non-parallel sides.

The outside cover 33 may also be made of any suitable material known in the art and is preferably in the form of a woven fabric with the warps and wefts disposed on a bias whereby such warps and wefts are each disposed at an angle other than 90° with the central longitudinal axis A of belt 20 and in a similar manner as the inside cover 31. The outside cover 33 may also be made of so-called "tire cord" fabric consisting of warps which are made of comparatively high strength cords with such high strength cords being held in parallel relation by wefts defined as comparatively weak tie strands. With the utilization of tire cord fabric for the outside cover 33 the high strength cords thereof may be disposed substantially at 90° with the axis A of the belt 20 or at an acute angle with such axis.

Referring again to FIG. 2, it is seen that the layer 26 separates the compression section into two portions consisting of a first or inner portion designated generally by the reference numeral 35 and disposed between one surface 36 of the layer 26 and the load-carrying section 22 and a second or outer portion 40 disposed outwardly of the opposite surface 41 of the layer 26. The compression section 23 and its portions 35 and 40 may be made of any suitable material employed in the art of making endless power transmission belts; however, preferably the compression section 23 and hence portions 35 and 40 thereof are made of any suitable polymeric material and in this example, such portions are shown made of polymeric material in the form of rubber. Further, in this example of the belt 20, the portions 35 and 40 are made of different polymeric materials which are basically in the form of different rubber compounds and this is indicated by the different directions or angles of cross-hatching portions 35 and 40 on opposite sides of the layer 26.

Figure 4:
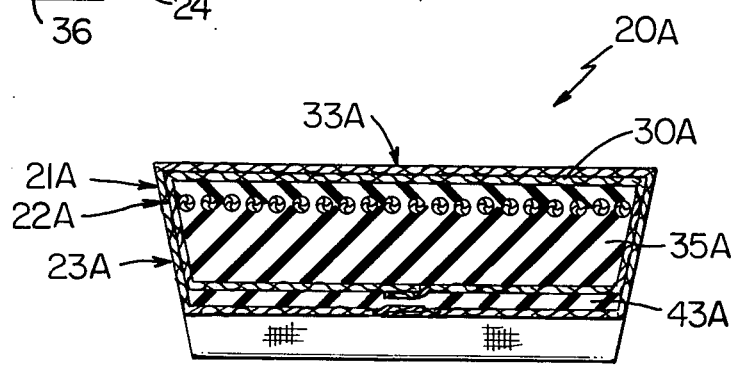
FIG. 4 is a view similar to FIG. 3 illustrating another exemplary embodiment of the belt of this invention.

Another exemplary embodiment of the belt of this invention is illustrated in FIG. 4 of the drawings. The belt illustrated in FIG. 4 is similar to the belt 20, therefore, such belt will be designated by the reference numeral 20A and representative parts of such belt which are similar to corresponding parts of the belt 20 will be designated in the drawings by the same reference numeral as in the belt 20 (whether or not such representative parts are mentioned in the specification) followed by the associated letter designation "A" and not described again in detail. Only those component parts of the belt 20A which are different from corresponding parts of the belt 20 will be designated by a new reference numeral also followed by the letter designation A and described in detail.

The belt 20A of FIG. 4 comprises a tension section 21A, a load-carrying section in the form of a load-carrying cord 22A, and a compression section 23A. The belt 20A also has an inside cover 30A, and an outside cover 33A. Similarly, the belt 20A has its compression section 23A comprised of a first or inner portion 35A.

The main difference between the belts 20 and 20A is in the outer portion of the compression section. In particular, such outer portion, which is designated by the reference numeral 43A, is comprised of the same polymeric material, and in this example the same rubber compound, as the inside portion 35A of the compression section 23A. To indicate that the outer portion 43A is of the same material as portion 35A, the cross-hatching lines of the inner portion 35A and outer portion 43A extend on the same angle. In all other respects, the belt 20A is basically substantially identical to the belt 20.

Having described the belts 20 and 20A, reference is now made to FIGS. 5–11 of the drawings for a detailed presentation of the method of making the belt 20. Further, except for one step, the method of making the belt 20A is very similar to the method of making the belt 20 whereby the detailed description will now be for the method of making belt 20 with only the above-mentioned step applicable to belt 20A being described subsequently.

Figure 5:
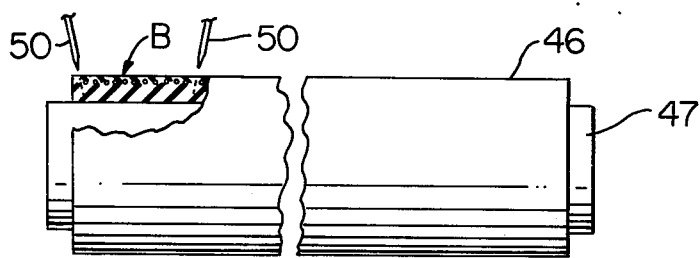
FIG. 5 is a view with parts in cross section, parts in elevation, and parts broken away illustrating a method step wherein an uncured annular or endless belt-defining body is cut from a tubular belt sleeve disposed on a mandrel.

The belt 20 may be made utilizing techniques which are known in the art to define an uncured tubular belt sleeve 46 about an associated mandrel 47 and as shown in FIG. 5. Basically, the uncured sleeve 46 is defined by wrapping various layers of material to define the main portions of the various sections of the belt 20. Once the belt sleeve 46 is defined, an uncured annular belt-defining body, designated generally by the reference letter B, is cut from the sleeve 46 employing cutting means shown as a pair of cutting knives or knife blades 50. It will be appreciated that a plurality of bodies B are cut from a particular sleeve 46; however, this detailed description is directed to the processing of a single body B.

The uncured belt body B has portions comprising the tension section portion of the belt and also designated by the reference numeral 21, the load-carrying section portion 22, and a compression section portion which is really the inner portion 35 of the compression section 23.

Figure 6:
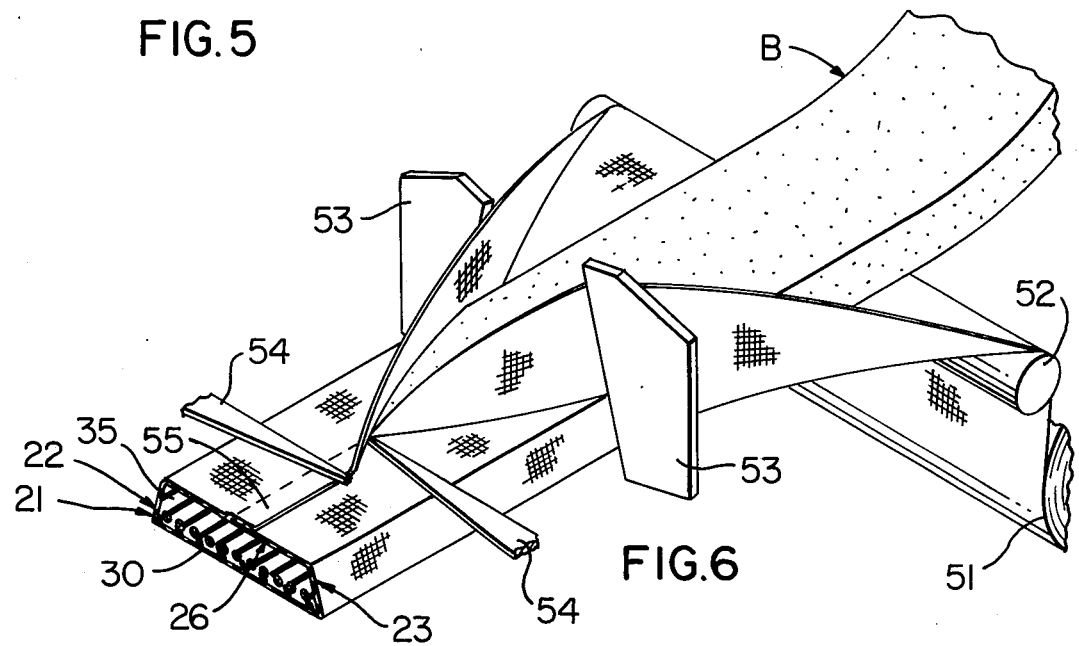
FIG. 6 is a fragmentary perspective view particularly illustrating the step of wrapping an inside cover on such belt body.

A fabric layer in the form of fabric layer 26 is then disposed against the exposed surface of the compression section portion and the layer 26 is defined as illustrated in FIG. 6 by wrapping the body B to define the overall inside cover 30 of the completed belt 20. The wrapping is achieved employing techniques known in the art whereby fabric material, designated by the same reference numeral 30 as the corresponding cover in the completed belt 20, is unwound from a supply roll 51 thereof, moved about a turn roll 52, whereupon it is engaged by a first pair of cooperating fingers each designated by the same reference numeral 53 to commence the wrapping operation. A second pair of cooperating fingers 54 is employed to complete the wrapping operation and define an overlapped area 55.

The wrapping of the fabric material as shown in FIG. 6 results in the provision of the inside cover 30 as well as the simultaneous provision of the layer 26. It will also be appreciated that the width of the cover 30 may be correlated with the size of the body B so that the terminal ends thereof are disposed in substantially abutting relation rather than the overlapped relation of FIG. 6.

Figure 7:
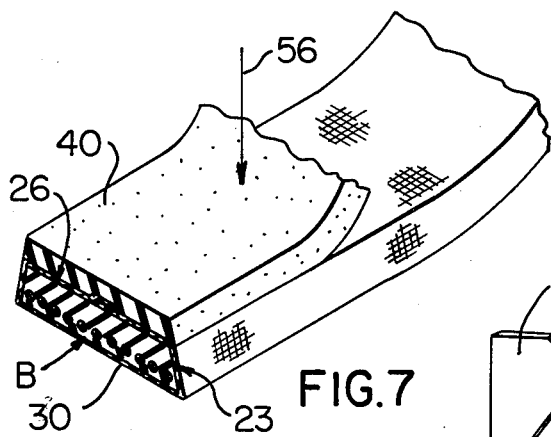
FIG. 7 is a fragmentary perspective view illustrating the step of disposing a strip of polymeric material against a surface of the fabric layer.

With the cover 30 wrapped about the belt body B a strip of polymeric material which defines the second portion 40 of the compression section, which has the teeth therein, is then disposed against the layer 26 and such disposing step is schematically indicated by the arrow 56 in FIG. 7. For simplicity, the strip is also designated by a reference numeral 40 to correspond to portion 40 of the compression section 23.

After disposing the strip 40, an outside layer 32 is provided on the compression section 23 against the outside surface of such strip and such layer 32 comprises part of an outside cover 33 which is wrapped in position as will now be described. The cover material 33 is provided on a supply roll 61 thereof and is moved about a turn roll 62 and a first pair of cooperating fingers 63 are employed to initially partially wrap the fabric 33 in position followed by a second pair of fingers 64 which complete the wrapping operation and define the overall cover 33 of belt 20 which covers the part of the belt surrounded by cover 20 which covers the part of the belt surrounded by cover 30 as well as the strip 40.

Figure 8:
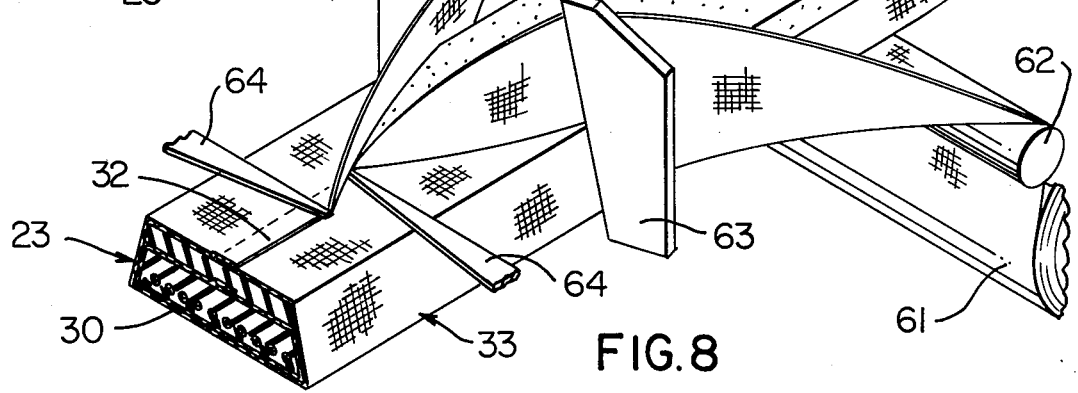
FIG. 8 is a view similar to FIG. 6 illustrating the step of wrapping an outside cover around the entire belt body including the strip disposed in position in FIG. 7.

Upon completion of this second wrapping operation, of FIG. 8, all of the component parts of the belt are defined and in position for further processing. In particular, such processing includes the forming of the integral teeth 24 in the outer part of the compression section and the curing and cooling of the belt.

The uncured belt structure as defined in FIG. 8 is cured and the teeth formed therein employing the apparatus and method illustrated in FIGS. 9, 10, and 11 and such apparatus is designated generally by the reference numeral 66. The apparatus 66 comprises a cylindrical outer body 67, a bottom 68, and a hinged cover 70 which is hingedly fastened to the body 67 at one edge thereof by a pin 71 and cover 70 is detachably fastened to the body 67 by a plurality of nut and bolt assemblies 72.

The apparatus 66 is of a known construction and operation and includes a mold 73 which supports a plurality of the annular endless bodies as defined in FIG. 8 for curing and forming of the toothed configuration in the compression section and in particular for the forming of the alternating projections or teeth 24 and recesses 25. During operation of the apparatus 66, steam under pressure is introduced through a conduit 74 into the cylindrical chamber 67 and conveyed by an internal pipe 75 through the top 76 of the mold 73 and such steam exits pipe 75 through an opening 77 in the top 76 and flows in the center of the interior of the mold 73 as indicated by arrows 78. Steam is also introduced through another conduit 79 and exits an opening 80 in the cylindrical body 67 and such steam is indicated by arrows 81 and substantially surrounds the mold 73.

The steam 81 is at a substantially greater pressure than the steam 78 thereby creating a differential pressure against the outside of the mold 73 and for a purpose to be subsequently described. Usually the pressure of the steam 81 is generally of the order of about 95 pounds per square inch while the steam 78 is generally of the order of about 65 pounds per square inch.

The mold 73 has a top wall 76 as previously described, an interior cylindrical belt supporting wall 82, and a bottom wall 83. The cylindrical wall 82 of such mold is comprised of a plurality of interlocking annular mold segments or rings each designated by the same reference numeral 84. The rings 84 have suitable locking means which enable such rings to be suitably interlocked for final forming of teeth 24 in the belts supported thereby. Each ring 84 comprising the central portion of the wall 82 has an annular tongue 85 extending from a bottom end thereof and a groove 86 defined in its top end. Each tongue 85 of a particular ring 84 comprising the central portion of wall 82 is particularly adapted to interlock with a groove 86 of an adjoining member to define the wall 82. Further, each top and bottom ring 84 of wall 82 has an annular projection 87 which is particularly adapted to be received in an annular recess 88 of its wall, either 76 or 83.

Each ring 84 is of roughly L-shaped overall cross section and cooperates with an adjoining ring 84 to define a belt receiving cavity 90. Each ring 84 also has an undulating surface 91 defined by alternating recesses 92 (FIG. 11) and projections 93 when viewed perpendicularly toward the center of the mold 73. The recesses 92 and projections 93 are particularly adapted to define teeth or projections 24 and recesses 25 respectively in each belt 20 as will now be explained.

A plurality of belt bodies are disposed within the annular cavities 90 defined by the interlocked rings 84 and with the narrow parallel side of each trapezoidal belt body being disposed as shown in FIG. 10 against the undulating surface 91 of an associated ring 84. Once a plurality of belt bodies are assembled within the mold 73 and such mold is completely filled, a yieldable cylindrical sleeve member 95 is disposed in position therearound as illustrated in FIGS. 9-11 of the drawings. The sleeve member 95 may be made of any suitable polymeric material, such as rubber.

With the member 95 in position, steam 81 and 78 is introduced through the respective conduits resulting In differential pressure being exerted on the sleeve 95. This differential steam pressure causes the yieldable sleeve-like member 95 to yieldingly compress the belt bodies inwardly toward the center of the mold 73, as shown by arrows 97 in FIG. 9, simultaneously forming the toothed configuration in the compression section and simultaneously curing the entire belt body while bonding all components thereof together as a unitary mass including the inside cover 30 and the outside cover 33 yet without requiring adhesive means, or the like. Thus, the entire body of the belt 20 is defined as a single-piece unitary belt construction.

Although, the forming of the toothed configuration in the compression section 23 of the belt 20 has been illustrated and described herein as being provided and made utilizing the yieldable sleeve-like member 95 made of a polymeric material such as a rubber compound, it is to be understood that the toothed configuration in such belt and the curing and bonding of components may be achieved employing any technique known in the art.

During the curing and formation of the teeth 24 the urging achieved by the higher steam pressure acting against the outside of the yieldable sleeve member 95, as indicated by arrows 97, causes the material in the outer portion 40 of the compression section to flow into an associated recess 92 of the ring 84. This action which defines each tooth 24 simultaneously moves the layer portion 26 comprising the inner cover 30 slightly inwardly within its tooth defining an undulation or apex 27 therein, as previously described.

The compression section 23 including its portions 35 and 40 may be made of any suitable polymeric material used in the art and as previously mentioned. Similarly, it is to be understood that the other sections of the endless power transmission belt 20 may also be made of any suitable material employed in the art to define the particular belt section.

As previously discussed, detailed method steps have been presented herein for the forming of the belt 20. However, it will be appreciated that basically the same method steps and apparatus for carrying out such steps are employed in making the belt 20A with the only exception being that instead of applying the strip 40 against the fabric layer defining the crack barrier a strip 43A is used. The strip 43A is made of the same polymeric material as the material employed in making the inner portion 35A of the compression section. The remaining steps are substantially identical to the previously described steps, including the simultaneous forming of teeth in the compression section and curing of the overall belt.

After forming and curing a plurality of belts, whether 20 or 20A, such belts are removed from the curing apparatus 66 as is known in the art and once cooled are ready for use. Any suitable means known in the art may be employed to cool the belts.

In the illustrations of FIGS. 1, 7 and 8 the warps and wefts of each illustrated fabric layer appear to be either parallel to or at 90° to the longitudinal axis of the associated belt body. However, these illustrations are merely symbolic showings of the fabric material. The actual fabric material used and particularly in the case of woven fabric with such warps and wefts are preferably disposed on a bias angle with the axis A of the belt for the inside cover 30. For the outside cover 33 of the belt the warps and wefts may be on a bias angle or with the warps at 90° to the axis A. Also, as previously mentioned tire cord fabric my be used to define the cover 33.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt having a tension section, a load-carrying section comprising a continuous, helically wound load-carrying cord and a toothed compression section; wherein said compression section has a first part adjacent to said load-carrying section and a second part adjacent to said first part and remote from said load-carrying section, said second part having a plurality of alternating projections and recesses, wherein said projections define the teeth of said belt; and wherein said belt has an inside fabric cover surrounding said tension section, said load-carrying section and said first part of said compression section, and an outside fabric cover surrounding said belt and including said second part of said compression section having said alternating projections and recesses and including the portion of said inside cover not disposed between said first and second parts; and wherein the portion of said inside cover disposed between said first and said second part of said compression section defines a crack barrier layer.

2. A belt as set forth in claim 1 in which said layer extends in an undulating path.

3. A belt as set forth in claim 2 in which said inside cover fabric is a bias fabric defined by warps and wefts and said warps and wefts are disposed at an acute angle with a central longitudinal axis of said belt.

4. A belt as set forth in claim 2 in which said undulating path has apexes disposed substantially within said teeth.

5. A belt as set forth in claim 1 in which said inside cover is a woven fabric cover.

6. A belt as set forth in claim 1 in which said outside cover is a tire cord fabric comprised of comparatively high strength warps interconnected by wefts formed of comparatively weaker tie strands.

7. A belt as set forth in claim 1 in which said outside cover is a woven fabric cover.

8. A belt as set forth in claim 1 in which said inside and outside covers are defined of woven fabric materials.

9. A belt as set forth in claim 1 in which said two portions of said compression section are made of the same polymeric material.

10. A belt as set forth in claim 1 in which said two portions of said compression section are made of different polymeric materials.

* * * * *

UNITED STATES PATENT OFFICE
CERTIFICATE OF CORRECTION

Patent No. 4,188,832  Dated February 19, 1980

Inventor(s) Dewey D. Henderson

It is certified that error appears in the above-identified patent and that said Letters Patent are hereby corrected as shown below:

Column 1, after line 61, insert the following paragraph --

Another feature of this invention is to provide a belt of the character mentioned in which the two above-mentioned portions of the compression section are made of different polymeric materials. --

Signed and Sealed this

Thirteenth Day of May 1980

[SEAL]

Attest:

SIDNEY A. DIAMOND

Attesting Officer

Commissioner of Patents and Trademarks